March 8, 1932.  A. I. LOGETTE ET AL  1,848,790
BRAKE TESTING APPARATUS
Filed March 19, 1931
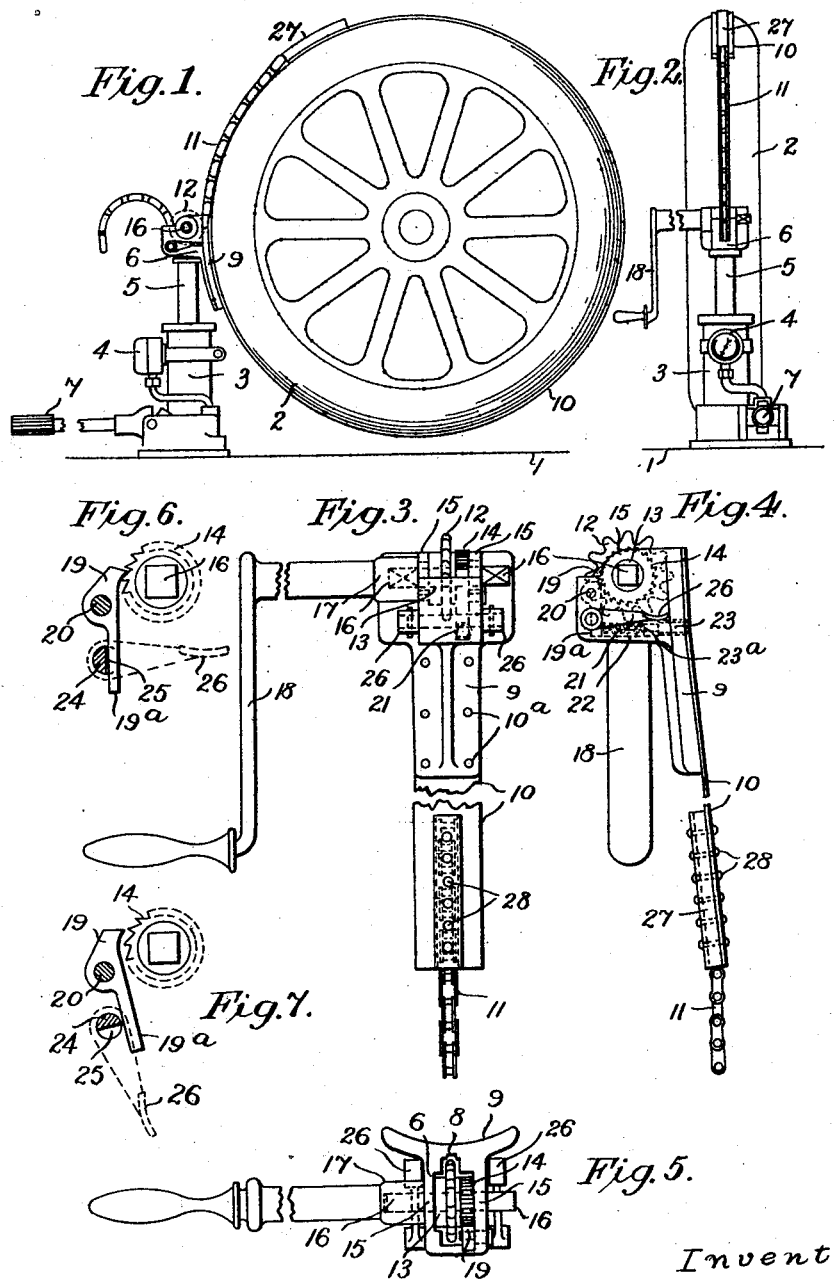
Inventors.
A. I. LOGETTE.
E. H. DAINTON.
per R. W. Bowden.
Attorney.

Patented Mar. 8, 1932

1,848,790

UNITED STATES PATENT OFFICE

ABRAHAM ISAAC LOGETTE AND EDGAR HARRY DAINTON, OF LONDON, ENGLAND

BRAKE TESTING APPARATUS

Application filed March 19, 1931, Serial No. 523,828, and in Great Britain February 14, 1930.

This invention relates to brake testing apparatus for motor and other vehicles, of the kind comprising a dynamometer adapted to be successively applied to each of the road wheels of the vehicle while the latter is raised with the brakes applied, so as to measure the torque required to turn the wheel against the resistance of its brake.

The object of the present invention is to provide a simple, compact and efficient brake testing apparatus of the kind referred to which can be readily applied to the road wheels of motor and other vehicles without disturbing the mud guards, tyres, axle caps or other associated parts.

According to this invention brake testing apparatus of the kind referred to comprises a hydraulic, screw or other suitable jack furnished with a pressure gauge so as to form a dynamometer, and an abutment adapted to be adjustably mounted upon the road wheel of the vehicle so as to co-operate with the jack for the purpose of turning the wheel against the resistance of its brake, which resistance is indicated by the pressure gauge.

The abutment is preferably mounted on the periphery of the wheel independently of the jack, but if desired may be carried by the jack and be furnished with a clamping device for securing the same to the rim or tyre of the wheel, or to one of the spokes thereof.

In one convenient construction the abutment comprises a bracket which carries a chain wheel, sprocket, quick-acting screw, cam or the like, to which bracket is secured one end of a flexible band, chain, cable or the like that is adapted to be passed round the circumference of the road wheel and its free end engaged with the chain wheel, sprocket, cam or the like mounted on the bracket.

The chain wheel, sprocket, screw, cam or the like is conveniently mounted on a spindle that journals in bearings on the bracket and is adapted to be engaged by a lever or handle by means of which the chain wheel, sprocket, screw, cam or the like is operated for the purpose of tightening the band, chain or cable about the wheel, and thus firmly secure the bracket in any required position upon the periphery of the wheel so as to form an abutment for the ram of the hydraulic or other jack.

The invention is illustrated by way of example in the accompanying drawings, wherein similar references indicate like parts.

Figure 1 is a side view and Figure 2 an end view illustrating a convenient construction of apparatus for testing, in accordance with the present invention, the brakes of a motor vehicle.

Figures 3 to 7 are detail views drawn to a larger scale further illustrating the construction of the brake testing apparatus shown in Figures 1 and 2.

Referring to the drawings: 1 indicates the ground line, 2 one of the wheels of a motor vehicle which has been raised so as to lift the road wheels clear of the ground, the brakes being applied to lock the road wheels.

3 indicates a hydraulic jack furnished with a pressure gauge 4 so as to form a dynamometer, the ram 5 of which jack is adapted to bear against an abutment 6 which is adjustably secured to the wheel 2 on which the brake action is to be tested.

As shown, the abutment 6 consists of a bracket formed with a central opening 8 and a saddle-shaped backplate 9 that is adapted to seat upon the wheel tyre. One end of a flexible steel band 10 is riveted at 10a to the backplate 9, while the other end of such band carries a length of roller chain 11 that is adapted to engage a sprocket wheel 12 which is mounted in the abutment bracket 6.

The sprocket wheel 12 together with a ratchet wheel 14 are mounted fast upon a spindle 13 that journals in bearings 15 formed one on each side of the central opening 8 of the bracket so that such sprocket and ratchet wheels work in the central opening of the bracket, while the spindle 13 is formed with square ends 16 that project beyond the bearings 15 on each side of the bracket so as to form purchases for the counterpart socket 17 of a removable cranked operating handle 18.

A detent 19 is pivoted at 20 in the bracket 6 so that it is normally held in engagement with the teeth of the ratchet wheel 14 by means of a coiled spring 21 which is secured in a perforation 22 of the bracket 6 by a screw plug 23 provided with an extension 23a which forms a guide for the spring.

The spring-controlled detent 19 is released from the ratchet wheel 14 by means of a cross spindle 24 in which a recess 25 is formed. Such cross spindle is journalled in the bracket 6 so that the tail 19a of the detent 19 normally rests in the recess 25 thereof, while the ends of such spindle project from each side of the bracket 6 and carry operating levers 26 (see Figures 3 to 5).

The roller chain 11 is attached to the free end of the steel band 10 by means of a channel-section bar 27 which is secured to the end of the band 10 by rivets 28 that pass through the openings in the chain 11, as shown at Figures 3 and 4.

As shown at Figures 1 and 2 the abutment bracket 6 is secured to the periphery of the wheel 2 by means of the flexible steel band 10 and roller chain 11 which are of sufficient length to pass round the wheel with part of the chain 11 overlapping.

The free end of the chain 11 is passed through the opening 8 in the bracket and returned in engagement with the lower part of the sprocket wheel 12, as indicated at Figure 1.

The sprocket wheel 12 is rotated by means of the cranked handle 18 which is applied to one or other of the projecting ends 16 of the spindle 13 so as to tighten the band 10 and chain 11 about the road wheel 2, and thus firmly secure the bracket 6 in any required position to form an abutment for the head of the ram 5 of the jack; return movement of the sprocket wheel 12 being prevented by the engagement of the detent 19 with the ratchet wheel 14.

When it is desired to remove or adjust the abutment 6 from or on the wheel 2, the detent 19 is disengaged from the ratchet wheel 14 by depressing one or other of the levers 26 mounted on the recessed spindle 24. The consequent turning of such spindle forces the tail 19a of the detent 19 out of the recess 25 against the resistance of its controlling spring 21, thus releasing the ratchet wheel, as indicated at Figure 7, so that the same can be reversed for the purpose of slackening the band 10 and roller chain 11, and thus enable the same to be easily adjusted on or removed from the road wheel 2.

The jack is operated by means of its pumping handle 7 so as to force the head of the ram against the abutment 6 secured to the wheel until the pressure of the jack is sufficient to move the wheel against the brake resistance which is registered by the gauge.

The apparatus is similarly applied to the several wheels of the vehicle so that the action of the brake on each wheel is registered by the pressure gauge of the jack and any inequalities in the resistance of the brakes on the several wheels are rectified by making the requisite adjustments of the brakes and brake gear.

We claim:—

Apparatus for testing the action of the brakes upon the wheels of a vehicle, comprising a jack furnished with a pressure gauge so as to form a dynamometer and an abutment adapted to be adjustably mounted upon one wheel of the vehicle so as to co-operate with the jack in order to turn the wheel against the resistance of its brake, thus registering the brake resistance on the gauge, such abutment comprising a bracket, a flexible member attached at one end to said bracket and adapted to be passed circumferentially around the periphery of the wheel, and tightened thereon, the means for tightening said flexible member comprising a sprocket wheel mounted in the bracket, together with a ratchet and detent device, and means for releasing the latter, said sprocket wheel being adapted to be manually operated.

In testimony whereof we affix our signatures.

ABRAHAM ISAAC LOGETTE.
EDGAR HARRY DAINTON.